US012595081B2

(12) United States Patent
Miyamoto

(10) Patent No.: US 12,595,081 B2
(45) Date of Patent: Apr. 7, 2026

(54) POSITIONING DEVICE, MOVING OBJECT, POSITIONING METHOD AND STORAGE MEDIUM

(71) Applicant: CASIO COMPUTER CO., LTD., Tokyo (JP)

(72) Inventor: Naotomo Miyamoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 146 days.

(21) Appl. No.: 18/542,931

(22) Filed: Dec. 18, 2023

(65) Prior Publication Data

US 2024/0208675 A1    Jun. 27, 2024

(30) Foreign Application Priority Data

Dec. 22, 2022    (JP) ................................. 2022-205013

(51) Int. Cl.
| | |
|---|---|
| *B64G 1/24* | (2006.01) |
| *B64G 1/36* | (2006.01) |
| *B64G 1/44* | (2006.01) |
| B64G 4/00 | (2006.01) |

(52) U.S. Cl.
CPC ............... *B64G 1/36* (2013.01); *B64G 1/247* (2023.08); *B64G 1/443* (2013.01); *B64G 2004/005* (2013.01)

(58) Field of Classification Search
CPC .. G05D 1/0212; G05D 1/0231; G05D 1/0251;

G05D 1/0272; G05D 1/0274; G05D 1/0088; G01C 22/00; G01S 19/42; A01D 2101/00; A01D 34/008
See application file for complete search history.

(56) References Cited

U.S. PATENT DOCUMENTS

| | | | | |
|---|---|---|---|---|
| 2013/0060461 A1* | 3/2013 | Wong | ..................... | G01C 21/20 |
| | | | | 701/300 |
| 2014/0100693 A1* | 4/2014 | Fong | ................... | G05D 1/0274 |
| | | | | 700/253 |
| 2016/0309974 A1* | 10/2016 | Abe | ...................... | G05D 1/0242 |
| 2017/0357270 A1* | 12/2017 | Russell | ................... | B25J 9/162 |
| 2018/0089616 A1* | 3/2018 | Jacobus | .............. | G05D 1/0274 |
| 2018/0329617 A1* | 11/2018 | Jones | ................... | G01C 21/206 |
| 2019/0265722 A1* | 8/2019 | Haeusler | .............. | G05D 1/0251 |
| 2020/0170470 A1* | 6/2020 | Liggett | ................. | A47L 9/2847 |

FOREIGN PATENT DOCUMENTS

| | | |
|---|---|---|
| JP | 2006209770 A | 8/2006 |
| JP | 2007155699 A | 6/2007 |
| JP | 2011134058 A | 7/2011 |
| JP | 2021076401 A | 5/2021 |
| JP | 2021096731 A | 6/2021 |

* cited by examiner

*Primary Examiner* — Stephen Holwerda
(74) *Attorney, Agent, or Firm* — Scully, Scott, Murphy & Presser, P.C.

(57) ABSTRACT

A positioning device includes at least one processor. The at least one processor detects a light source and a target object different from the light source in an image captured by an imager. A moving object has the imager and moves in a space. The at least one processor derives a position of the moving object in the space based on positions of the light source and the target object in the image and known positions of the light source and the target object in the space.

12 Claims, 6 Drawing Sheets

133

| LIGHT SOURCE ID | IN-SPACE POSITION |
|---|---|
| 1001 | (X11, Y11, Z11) |
| 1002 | (X12, Y12, Z12) |
| 1003 | (X13, Y13, Z13) |
| ⋮ | ⋮ |

134

| AREA WHERE MOVING OBJECT IS POSITIONED | OBSERVABLE TARGET OBJECT | | | |
|---|---|---|---|---|
| | NAME | DIRECTION | IN-SPACE POSITION | OBSERVABLE TIME PERIOD |
| R1 | MOUNTAINTOP 30a | Da | (X21, Y21, Z21) | Ta |
| | LUNAR BASE 30c | Db | (X22, Y22, Z22) | Tb |
| | ⋮ | ⋮ | ⋮ | ⋮ |
| R2 | LUNAR BASE 30c | Dc | (X22, Y22, Z22) | Tb |
| | MOUNTAINTOP 30b | Dd | (X23, Y23, Z23) | Tc |
| | ⋮ | ⋮ | ⋮ | ⋮ |
| R3 | ROCK | De | (X24, Y24, Z24) | Td |
| | ⋮ | ⋮ | ⋮ | ⋮ |
| ⋮ | ⋮ | ⋮ | ⋮ | ⋮ |

POSITIONING DEVICE, MOVING OBJECT, POSITIONING METHOD AND STORAGE MEDIUM

REFERENCE TO RELATED APPLICATIONS

This application is based upon and claims the benefit of priority from the prior Japanese Patent Application No. 2022-205013, filed on Dec. 22, 2022, the entire content of which is incorporated herein by reference.

TECHNICAL FIELD

The present disclosure relates to a positioning device, a moving object, a positioning method and a storage medium.

DESCRIPTION OF RELATED ART

There is disclosed, for example, in JP 2021-76401 A, a technique of performing positioning of a moving object indoors using information from light sources that emit light.

SUMMARY OF THE INVENTION

According to an aspect of the present disclosure, there is provided a positioning device including at least one processor that detects a light source and a target object different from the light source in an image captured by an imager, wherein a moving object has the imager and moves in a space, and derives a position of the moving object in the space based on positions of the light source and the target object in the image and known positions of the light source and the target object in the space.

BRIEF DESCRIPTION OF DRAWINGS

The accompanying drawings are not intended as a definition of the limits of the present disclosure but illustrate embodiments of the present disclosure, and together with the general description given above and the detailed description of embodiments given below, serve to explain the principles of the present disclosure, wherein.

DETAILED DESCRIPTION

Hereinafter, one or more embodiments of the present disclosure will be described with reference to the drawings.

Configuration of Positioning System

Figure 1:
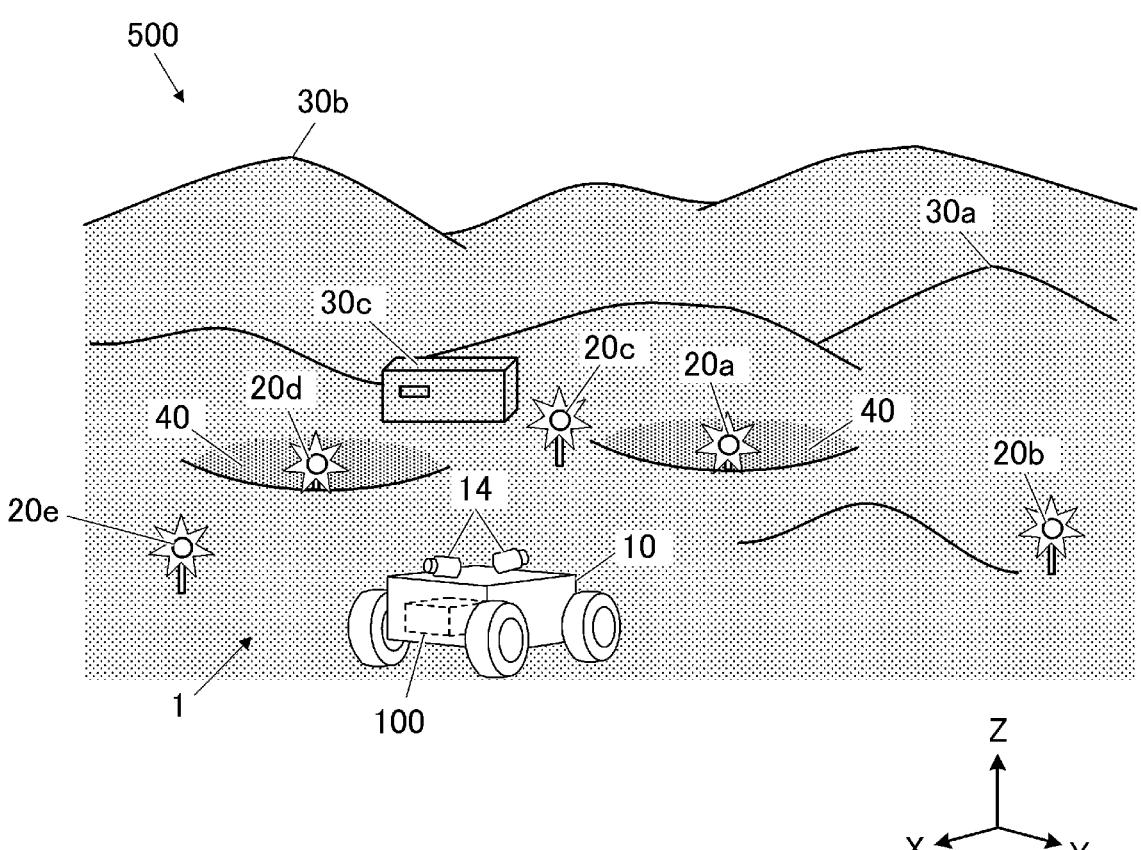
FIG. 1 shows configuration of a positioning system.

FIG. 1 shows configuration of a positioning system 1 of an embodiment(s).

The positioning system 1 includes a moving object 10 and a plurality of light sources 20a, 20b, 20c, 20d, 20e, etc., which hereinafter may be referred to as "light sources 20". In this embodiment, the positioning system 1 is used in a space 500 on the lunar surface as an example.

Hereinafter, positions of the moving object 10, the light sources 20 and target objects 30, which will be described below, in the space 500 are expressed by the XYZ Cartesian coordinate system. The Z direction is the upward direction in the vertical direction (direction of lunar gravitational acceleration), and the X and Y directions are perpendicular to one another and to the Z direction.

The moving object 10 is a lunar rover (rover) that autonomously travels (moves) and explores the space 500 on the lunar surface. The moving object 10 includes two cameras 14 (imager(s)) and a positioning device 100 that derives the position and orientation of the moving object 10 on the basis of an image(s) captured by the camera(s) 14. In this specification, deriving at least the position of the moving object 10 in the space 500 is referred to as "positioning". In this embodiment, however, the positioning device 100 derives both the position and the orientation of the moving object 10 in the space 500 as an example. The moving object 10 autonomously moves toward a set destination while identifying its own position and orientation on the basis of results of positioning that the positioning device 100 performs at a predetermined frequency.

The light sources 20 are spaced from one another on the lunar surface. The positions (X, Y, Z coordinates) of the light sources 20 in the space 500 are known by being surveyed at the time of their installation. The light sources 20 function as position indicators indicating positions on the lunar surface, and are called markers too. Each light source 20 has, for example, three light emitting diodes (LEDs) that respectively emit red light, green light and blue light, and emits light with a unique emission pattern. That is, each light source 20 changes its emission color over time with a pattern predetermined for the light source 20. By decoding the emission pattern of each light source 20, a light source ID assigned to the light source 20 can be determined. Thus, the light sources 20 are used for visible light communication, which transmits information (light source IDs in this embodiment) by visible light.

The light sources 20 are installed such that two or more light sources 20 are photographable with the cameras 14 no matter where the moving object 10 is positioned in areas where the moving object 10 May move in the space 500. As power sources for the light sources 20, solar cells or the like can be used.

With rechargeable batteries of an appropriate capacity (ies) connected to the light sources 20, the light sources 20 can emit light during the night period of the moon too. The night period of the moon is a period in which the sunlight does not directly reach the moon according to the moon's rotation. Hereinafter, it is referred to as "nighttime". FIG. 1 depicts the light sources 20 emitting light in the nighttime. In the nighttime, the space 500 is dark, so that the emission patterns of the light sources 20 can be observed well. On the other hand, during the day period of the moon, if the sunlight directly reaches the light sources 20, the emission patterns of the light sources 20 May be blocked out by the sunlight and become unobservable (undetectable in images captured by the cameras 14). The day period of the moon is a period in which the sunlight directly reaches the moon according to the moon's rotation. Hereinafter, it is referred to as "daytime". It is therefore preferable to, wherever possible, install the light sources 20 at places that are shaded even in the daytime, such as depressions 40 (e.g., crater) shown in FIG. 1.

In this embodiment, various objects different from the light sources 20 are also used as position indicators. Examples thereof include landscapes on the lunar surface, such as mountaintops 30a, 30b, and landmarks on the lunar surface, such as a lunar base 30c. Hereinafter, such objects, which include the mountaintops 30a, 30b and the lunar base 30c, may be referred to as "target objects 30".

Figure 2:
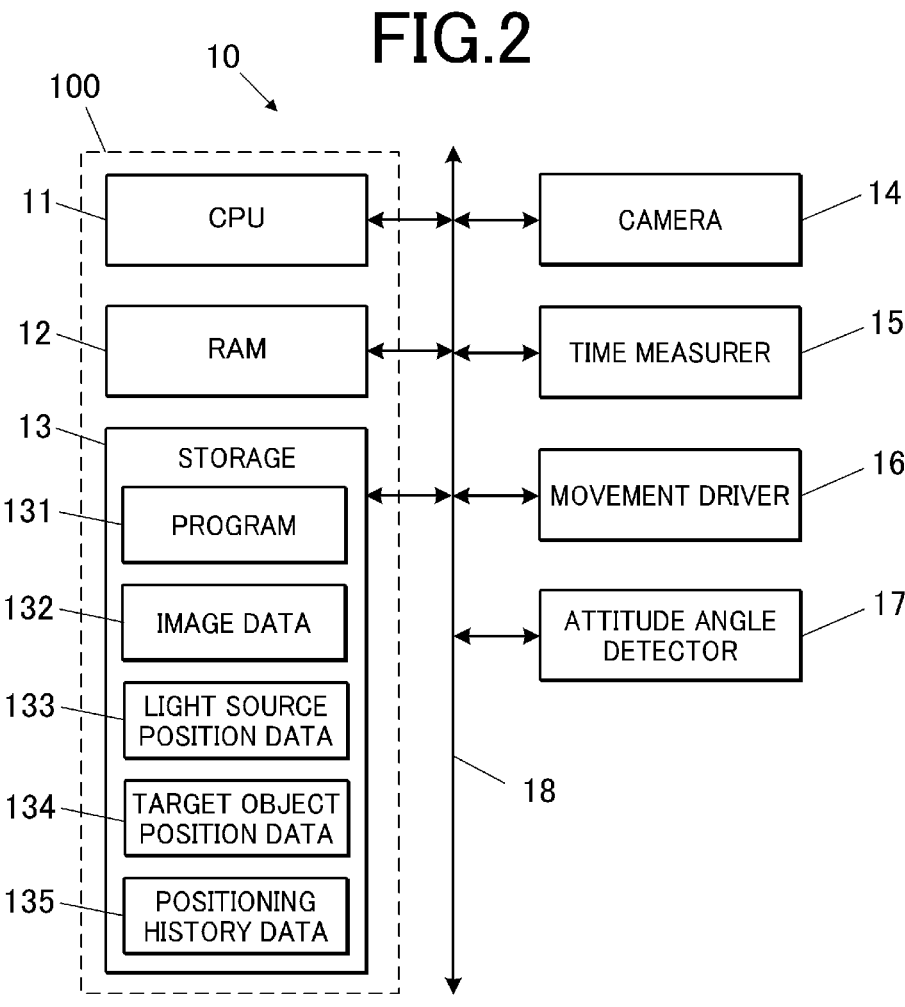
FIG. 2 is a block diagram showing a functional configuration of a moving object.

FIG. 2 is a block diagram showing a functional configuration of the moving object 10.

The moving object 10 includes a central processing unit (CPU) 11, a random access memory (RAM) 12, a storage 13, the cameras 14, a time measurer 15, a movement driver 16 and an attitude angle detector 17. Of these, the CPU 11, the RAM 12 and the storage 13 constitute the positioning device 100. The components of the moving object 10 are connected to one another via a communication path 18, such as a bus.

The CPU 11 is a processor that reads and executes programs 131 stored in the storage 13, thereby controlling the operation of the moving object 10 and also performing a process(es) relevant to positioning that the positioning device 100 performs. The moving object 10 (positioning device 100 thereof) may have a plurality of processors (e.g., CPUs), and these processors may perform a plurality of processes that the CPU 11 of this embodiment performs.

In this case, the processors may be involved in the same process(es) or may independently perform different processes in parallel. In the latter case, one or more of the processors may control the operation of the moving object 10, and another one or more of the processors may perform the process(es) relevant to positioning that the positioning device 100 performs.

The RAM 12 provides a working memory space for the CPU 11 and stores temporary data.

The storage 13 is a non-transitory storage medium readable by the CPU 11 as a computer and stores the programs 131 and various data. The storage 13 includes a nonvolatile memory, such as a hard disk drive (HDD) or a solid state drive (SSD). The data stored in the storage 13 includes image data 132 of each image captured by the cameras 14, light source position data 133 including information on the position of each light source 20, target object position data 134 including information on the position of each target object 30, and positioning history data 135 including information on a history (log) of positioning that the positioning device 100 has performed.

The cameras 14 each capture an image of the space 500 at a predetermined frame rate (e.g., 30 fps or 60 fps), and output image data 132 thereof to the positioning device 100. As shown in FIG. 1, the moving object 10 is provided with two cameras 14 that capture images of areas in front of and behind the moving object 10, respectively. Two cameras 14 are used in order to ensure the detection area of light of the light sources 20 (light for visible light communication) and to prevent correction errors of optical distortions of lenses or the like.

If the distortion correction can be performed well, a single camera with an ultra-wide-angle lens may be used.

The time measurer 15 calculates and keeps the current time and outputs the keeping time to the CPU 11. The time that is calculated by the time measurer 15 May be the earth's Coordinated Universal Time (UTC), or may be the one representing the passage of time in moon's one day, which is a whole day (daytime) and night (nighttime) of the moon and equivalent to about 27.3 days on the earth.

The movement driver 16 drives (rotates) wheels that are of the moving object 10 to move, changes the moving direction of the moving object 10, or the like, in accordance with a control signal transmitted from the CPU 11. Thus, the CPU 11 can control the moving speed and the moving direction of the moving object 10 by transmitting control signals to the movement driver 16.

The attitude angle detector 17 is, for example, a six-axis sensor including a three-axis accelerometer that detects accelerations in directions of three axes and a three-axis angular velocity sensor (gyro sensor) that detects angular velocities around the three axes. The attitude angle detector 17 derives the attitude angle (yaw, pitch and roll) of the moving object 10 on the basis of output values of the three-axis accelerometer and the three-axis angular velocity sensor, and outputs the derived attitude angle to the positioning device 100.

The attitude angle detector 17 May output the output values of the three-axis accelerometer and the three-axis angular velocity sensor to the positioning device 100, and the CPU 11 of the positioning device 100 may derive the attitude angle on the basis of these output values.

Operation of Positioning System

Next, the operation of the moving object 10 and the positioning device 100 included therein of the positioning system 1 will be described.

As described above, the positioning device 100 of the moving object 10 performs positioning of the moving object 10 at a predetermined frequency. Although the CPU 11 of the positioning device 100 is the main component that performs the process(es) relevant to positioning described below, the positioning device 100 may be described as the main component for convenience.

The positioning device 100 detects at least two position indicators in images captured by the cameras 14 at the same timing or in an image 60 (e.g., shown in FIG. 3) captured by one of the cameras 14, the position indicators whose positions in the space 500 are known, and derives the position and orientation of the moving object 10 in the space 500 on the basis of the positions of the at least two position indicators in the images or the image 60 and the known positions of the at least two position indicators in the space 500. Hereinafter, the positions of position indicators in the image 60 (coordinates of pixels corresponding to position indicators in the image 60) are referred to as "in-image positions", and the positions of position indicators in the space 500 (X, Y, Z coordinates of position indicators in the space 500) are referred to as "in-space positions".

As mentioned above, the light sources 20 are a type of position indicator. If the positioning device 100 detects a plurality of light sources 20 in the image 60, the positioning device 100 derives the position and orientation of the moving object 10 in the space 500 on the basis of the in-image positions and the in-space positions of at least two light sources 20 among the plurality of light sources 20. As described above, since the space 500 is dark in the nighttime, two or more light sources 20 can usually be detected in the image 60 captured in the nighttime. Thus, in the nighttime, the positioning device 100 can perform positioning using only light sources 20 as position indicators.

If the positioning device 100 can detect only one light source 20 or less in the image 60, the positioning device 100 uses a target object(s) 30 (in the space 500) on the lunar surface, the target object(s) 30 being different from the light sources 20, as a position indicator(s). That is, if the positioning device 100 can detect only one light source 20, the positioning device 100 derives the position and orientation of the moving object 10 on the basis of the in-image positions and the in-space positions of the one light source 20 and at least one target object 30, whereas if the positioning device 100 can detect no light source 20 in the image 60, the positioning device 100 derives the position and orientation of the moving object 10 on the basis of the in-image positions and the in-space positions of at least two target objects 30. The target objects 30 are objects having representative points (feature points) that can be identified in the image 60 and in the space 500. Examples of the target objects 30 include a portion of a ridgeline (e.g., mountaintop), a portion of the horizon, an edge of a landform (e.g., rock or crater), and a structure (e.g., lunar base).

Examples of the case where the number of light sources 20 detectable in the image 60 is one or less include a case where light of some or all of the light sources 20 is blocked out by the sunlight in the daytime and becomes unobservable and a case where obstacles that block light are present between the moving object 10 and some or all of the light sources 20.

Figure 3:
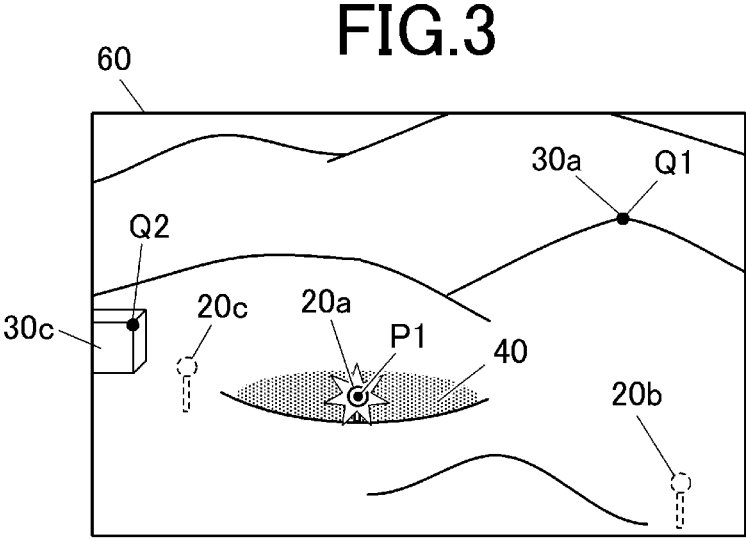
FIG. 3 shows an example of an image that is used for positioning.

FIG. 3 shows an example of the image 60, which is used for positioning.

The image 60 shown in FIG. 3 is an image obtained by photographing a portion of the space 500 in the daytime with one of the cameras 14. Since the depression 40 is shaded, the light source 20*a* located in the depression 40 is detectable in the image 60. Meanwhile, light of the light sources 20*b*, 20*c* located at sunny places is blocked out by the sunlight, so that the light sources 20*b*, 20*c* are undetectable in the image 60.

Thus, if the positioning device 100 can detect only one light source 20, i.e., 20*a*, in the image 60, the positioning device 100 detects a target object(s) 30, such as the mountaintop 30*a* and/or the lunar base 30*c*, in the image 60 in addition to the light source 20*a*, and uses these for positioning. Hereinafter, the operation of the positioning device 100 in a case will be described as an example, the case where the positioning device 100 performs positioning using the light source 20*a* and the mountaintop 30*a* in the image 60 shown in FIG. 3.

When obtaining the image 60 from the camera 14, the positioning device 100 first detects the light source 20*a* in the image 60. More specifically, the positioning device 100 detects the emission pattern of the light source 20 that is in the image 60, from the most recent image group (moving image) of a predetermined number of frames including the image 60, and decodes the detected emission pattern, thereby determining its light source ID. Determining a light source ID corresponds to identifying a light source 20 (e.g., as 20*a*). The positioning device 100 refers to the light source position data 133 to obtain the in-space position of the light source 20 having the determined light source ID.

Figures 4, 5:
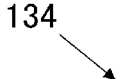
FIG. 4 shows an example of the contents of light source position data.
FIG. 5 shows an example of the contents of target object position data.

FIG. 4 shows an example of the contents of the light source position data 133.

In the light source position data 133, each light source ID is associated and stored with the installation position in the space 500 (in-space position) of a light source 20 to which the light source ID is assigned. The light source ID of the light source 20*a* shown in FIG. 3 is "1001", and the in-space position of the light source 20*a* is "(X11, Y11, Z11)".

The positioning device 100 detects the target object 30*a* in the image 60 with a method described below.

First, the positioning device 100 refers to the target object position data 134, and determines, as candidates, target objects 30 that could be in the image 60 on the basis of a previous positioning result (position of the moving object 10 derived most recently) and the current time being measured by the time measurer 15. The positioning device 100 obtains, on the basis of the target objects 30 determined as candidates, an identification result of the target object 30 (mountaintop 30*a*) that is actually in the image 60, and determines the in-space position of the target object 30 (mountaintop 30*a*) on the basis of the obtained identification result of the target object 30. Obtaining an identification result of a target object 30 (e.g., 30*a*) is included in detecting a target object 30 (e.g., 30*a*) in the image 60.

FIG. 5 shows an example of the contents of the target object position data 134.

In the target object position data 134, for each area R of areas R (areas R1, R2, R3, etc.) into which the space 500 is divided, a target object(s) 30 observable from the area R is/are registered. The target object position data 134 includes "Name", "Direction", "In-space Position" and "Observable Time Period" as data on each observable target object 30.

The "Name" is a name of an observable target object 30.

The "Direction" is a direction in which an observable target object 30 is observed from a representative position (e.g., center) in an area R.

The "In-space Position" is X, Y, Z coordinates of an observable target object 30 in the space 500 surveyed in advance. Thus, the in-space position of each target object 30 is known.

The "Observable Time Period" is a time period during which an observable target object 30 is observable from a representative position in an area R. For example, regarding a target object 30 that becomes unobservable even in the daytime depending on a time period because it is located behind a high mountain, a time period excluding a time period in which the target object 30 is unobservable is recorded in the "Observable Time Period".

By referring to, of the target object position data 134, the area R to which the position of the moving object 10 in the previous positioning result belongs, the positioning device 100 can determine, as candidates, target objects 30 observable from the current position (strictly speaking, the most recent position) of the moving object 10, and determine the directions in which the respective observable target objects 30 are observable. By performing image recognition or the like and comparing the target object 30 that is in the image 60 with the determined candidates, the positioning device 100 can obtain an identification result of the target object 30 (i.e., 30*a*) that is in the image 60 and can detect the target object 30 (i.e., 30*a*) in the image 60. Further, the positioning device 100 can determine the in-space position of the identified target object 30 from the target object position data 134. The positioning device 100 may further refer to the orientation of the moving object 10 in the previous positioning result, thereby determining a direction in which the image 60 was captured, which further enhances the identification accuracy of the target object 30.

The positioning device 100 detects the mountaintop 30*a* in the image 60 shown in FIG. 3, namely, identifies the target object 30 in the image 60 as the mountaintop 30*a*, and determines the in-space position thereof as "(X21, Y21, Z21)".

The method for identifying/detecting the target object 30 in the image 60 is not limited to the method described above.

For example, instead of using the area R, the positioning device 100 may determine, as candidates, target objects 30 that could be in the image 60 directly from the position (X, Y, Z coordinates) of the moving object 10 in the previous positioning result. For example, it is possible to create a 3D model of the space 500 in advance, and by simulation based on the 3D model, determine, as candidates, target objects 30 visible from the current position (most recent position) of the moving object 10. By comparing the image 60 with the candidates determined by the simulation, the positioning device 100 can obtain an identification result of each target object 30 that is in the image 60. Instead of the above 3D model, a map of the lunar surface including height information may be used to determine target objects 30 that could be in the image 60 as candidates.

Alternatively, each target object 30 that is actually in the image 60 May be identified by inputting the image 60 into a machine learning model. That is, it is possible to prepare a machine learning model that has learned positions, shapes, sizes and so forth of target objects 30 observable from a plurality of points on the lunar surface, and input the image 60 and the previous positioning result (position of the moving object 10 and, if necessary, orientation thereof too) into the machine learning model, thereby determining whether a target object(s) 30 as a candidate(s) is actually in the image 60, and if so, obtaining an identification result(s) of the target object(s) 30 as an output(s). The machine learning model may be stored in the storage 13, or may be stored in an external device. If the machine learning model is stored in an external device, data of the image 60 or the like is input to the machine learning model stored in the external device by a not-shown communicator that the moving object 10 has, and the result output from the external device is received thereby.

In either case, the in-space position of the identified target object 30 can be obtained from table data (which may be the target object position data 134) in which target objects 30 are associated with their respective in-space positions.

When detecting the light source 20a and the mountaintop 30a as position indicators in the image 60, the positioning device 100 derives the position and orientation of the moving object 10 in the space 500 on the basis of the in-image positions of the light source 20a and the mountaintop 30a in the image 60 and the in-space positions of the light source 20a and the mountaintop 30a in the space 500.

Figure 6:
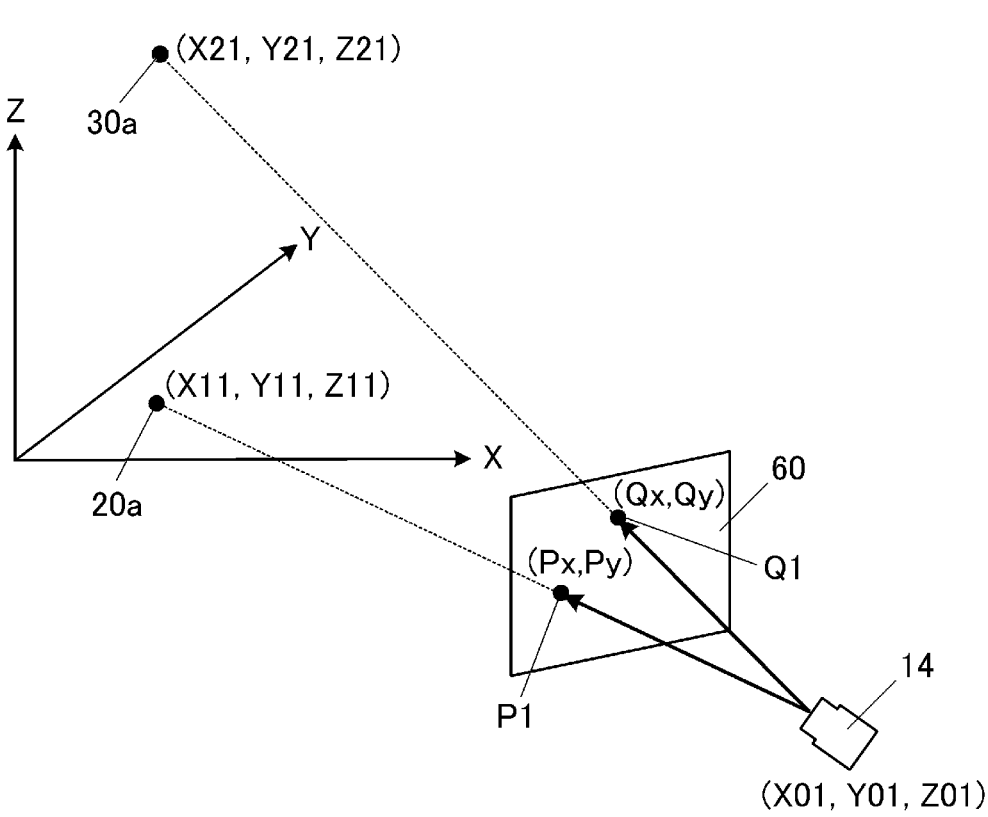
FIG. 6 is an illustration to explain a method for deriving the position of the moving object.

FIG. 6 is an illustration to explain a method for deriving the position (and orientation) of the moving object 10 in the space 500.

In this embodiment, the in-image position of the light source 20a in the image 60 is a point P1 (Px, Py), and the in-image position of the mountaintop 30a in the image 60 is a point Q1 (Qx, Qy). The positioning device 100 derives the in-space position (X01, Y01, Z01, wherein Z01 is fixed) of the moving object 10 (camera 14) in accordance with the principles of triangulation on the basis of the in-image position (point P1) of the light source 20a and the in-image position (point Q1) of the mountaintop 30a in the image 60 and the in-space position (X11, Y11, Z11) of the light source 20a and the in-space position (X21, Y21, Z21) of the mountaintop 30a in the space 500. The positioning device 100 further derives the orientation of the moving object 10 (camera 14) on the basis of the in-space position (X01, Y01, Z01) of the moving object 10 and the position(s) of the light source 20a and/or the mountaintop 30a in the image 60.

With this method, the positioning device 100 can derive the position and orientation (horizontal direction) of the moving object 10 (camera 14) on the assumption that the height and two degrees of freedom (pitch and roll) of the attitude angle of the moving object 10 (camera 14) are fixed. In the case where the attitude angle of the moving object 10 could vary due to, for example, a road surface being uneven, the positioning device 100 may derive the position and orientation of the moving object 10 that have been corrected on the basis of the detection result of the attitude angle by the attitude angle detector 17. For example, the positioning device 100 may derive the position of the moving object 10 after correcting the orientation or the like of the image 60 (positions of the light source 20a and the mountaintop 30a in the image 60) on the basis of the detection result of the attitude angle by the attitude angle detector 17.

The detection accuracy of the positions of the target objects 30 in the image 60 tends to be lower than the detection accuracy of the positions of the light sources 20 in the image 60. This is because, for example, the target objects 30 are not luminous objects and therefore difficult to distinguish from their surrounding objects in the image 60 and also because the accuracy of another process (e.g., image recognition) for identifying the target objects 30 affects the detection accuracy of the positions of the target objects 30 in the image 60. Therefore, in the case where a plurality of target objects 30 is detectable in the image 60 in addition to one light source 20, positioning may be performed using the one light source 20 and at least two target objects 30 among the plurality of target objects 30 as position indicators (i.e., using three or more position indicators), which enhances the positioning accuracy. For example, in the example shown in FIG. 3, in addition to the light source 20a and the mountaintop 30a as a target object 30, the lunar base 30c (e.g., a feature point of a corner thereof (in-image position: point Q2)) as a target object 30 may further be used for positioning.

Figure 7:
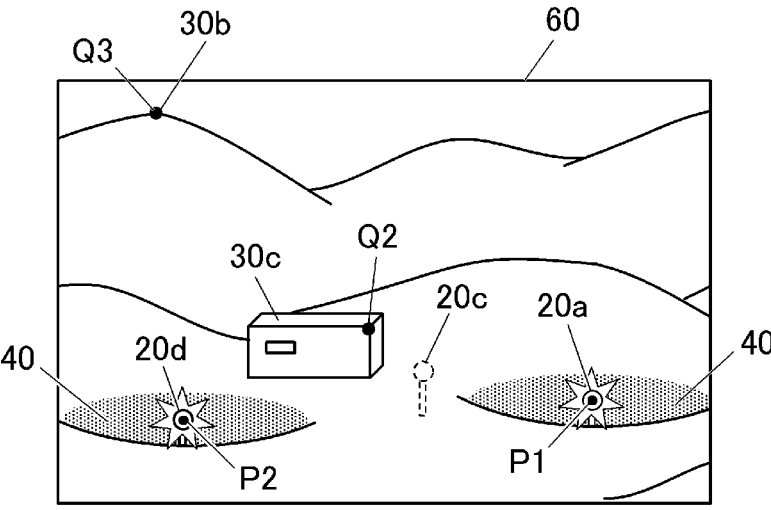
FIG. 7 shows another example of the image.

FIG. 7 shows another example of the image 60.

The image 60 shown in FIG. 7 is an image obtained by photographing a portion of the space 500 in the daytime with one of the cameras 14, the portion being different from the portion shown in FIG. 3. In this image 60, the emission patterns of two light sources 20, i.e., 20a (in-image position: point P1) and 20d (in-image position: point P2), which are located in two shaded depressions 40, are observable, so that these light sources 20a, 20d are detectable in the image 60. With reference to the light source position data 133, the in-space positions of the light sources 20a, 20d are obtainable. The positioning device 100 derives the position and orientation of the moving object 10 on the basis of the in-image positions of the light sources 20a, 20d in the image 60 and the in-space positions of the light sources 20a, 20d in the space 500 with the same method described with reference to FIG. 6 except that the mountaintop 30a in FIG. 6 is replaced by the light source 20d, and the point Q1 in the image 60 in FIG. 6 is replaced by the point P2 corresponding to the light source 20d.

In the case where two light sources 20 are detectable in the image 60, a target object(s) 30, which is/are different from the light sources 20, may further be used as a position indicator(s). That is, positioning may be performed by using three or more position indicators including the two light sources 20 and a target object(s) 30. For example, in the image 60 shown in FIG. 7, the lunar base 30c (in-image position: point Q2) and the mountaintop 30b (in-image position: point Q3) as target objects 30 are detectable in addition to the light sources 20a, 20d. At least one of the lunar base 30c and the mountaintop 30b may further be used as a position indicator(s) in addition to the light sources 20a, 20d. This enhances the positioning accuracy as compared with the case of positioning using only two light sources 20.

By using three or more position indicators, positioning of more degrees of freedom is performable. That is, in the case where two position indicators are used, positioning of three degrees of freedom that are the horizontal position (X, Y coordinates) and the horizontal direction is performable, whereas in the case where three or more position indicators are used, positioning of four or more degrees of freedom that are the abovementioned three degrees of freedom and at least one of the coordinate in the vertical direction (Z coordinate) and two degrees of freedom (pitch and roll) of the attitude angle is performable. Ideally, six position indicators are used, so that positioning of six degrees of freedom that are the three-dimensional coordinates (horizontal position and height) and the three-axis attitude angle (yaw (horizontal direction), pitch and roll) is performable. If seven or more position indicators are detected, light sources 20 are preferentially used as position indicators, which further enhances the positioning accuracy.

Next, a positioning-and-moving process that is performed by the CPU 11 for moving the moving object 10 while performing the above-described positioning will be described.

Figure 8:
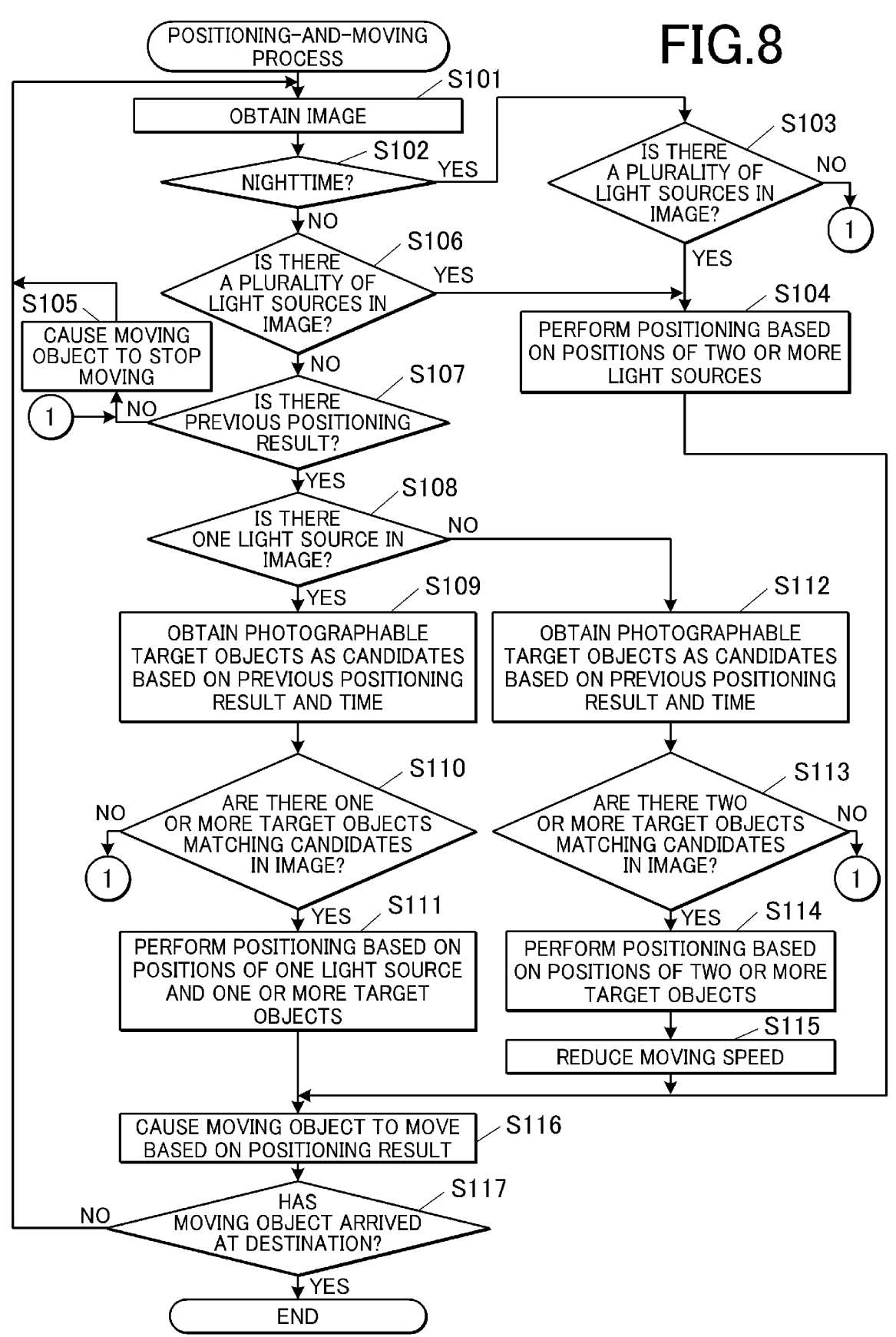
FIG. 8 is a flowchart showing an example of a control procedure of a positioning-and-moving process.

FIG. 8 is a flowchart showing a control procedure of the positioning-and-moving process.

The positioning-and-moving process is started when the moving object 10 starts to operate on the lunar surface.

When the positioning-and-moving process is started, the CPU 11 obtains the image 60 captured by the camera 14 (Step S101). The CPU 11 determines whether it is nighttime (Step S102). In this embodiment, the CPU 11 determines whether it is nighttime on the basis of the current time being measured by the time measurer 15. Alternatively, the CPU 11 May determine whether it is nighttime on the basis of the brightness of the image 60. For example, if the average brightness of the pixels of the image 60 is equal to or less than a predetermined reference brightness, the CPU 11 determines that it is nighttime.

If the CPU 11 determines that it is nighttime (Step S102; YES), the CPU 11 attempts to detect light sources 20 in the image 60 with the method described above, and determines whether the CPU 11 has detected a plurality of light sources 20 in the image 60 (Step S103). If the CPU 11 determines that the CPU 11 has detected a plurality of light sources 20 in the image 60 (Step S103; YES), the CPU 11 performs positioning, namely, derives the position and orientation of the moving object 10, on the basis of the in-image positions and the in-space positions of two or more light sources 20 among the plurality of light sources 20 detected in the image 60, and records the positioning result in the positioning history data 135 (Step S104).

If the CPU 11 determines that the CPU 11 has not detected a plurality of light sources 20 in the image 60 (Step S103; NO), the CPU 11 transmits a control signal to the movement driver 16 to cause the moving object 10 to stop moving (Step S105). This is because the moving object 10 moving around without knowing its own position and/or orientation may greatly deviate from a route to a destination or may cause an unforeseen accident. After Step S105, the CPU 11 returns the process to Step S101.

In Step S102, if the CPU 11 determines that it is not nighttime, namely, it is daytime (Step S102; NO), the CPU 11 attempts to detect light sources 20 in the image 60, and determines whether the CPU 11 has detected a plurality of light sources 20 in the image 60 (Step S106). If the CPU 11 determines that the CPU 11 has detected a plurality of sources 20 in the image 60 (Step S106; YES), the CPU 11 moves the process to Step S104 to perform positioning using two or more light sources 20.

If the CPU 11 determines that the CPU 11 has not detected a plurality of light sources 20 in the image 60 (Step S106; NO), the CPU 11 determines whether a previous positioning result is recorded (stored) in the positioning history data 135 (Step S107). If the CPU 11 determines that no previous positioning result is recorded therein (Step S107; NO), the CPU 11 moves the process to Step S105 to cause the moving object 10 to stop moving because the CPU 11 cannot obtain the current position of the moving object 10, which is needed to identify/detect target objects 30 in the image 60.

If the CPU 11 determines that a previous positioning result is recorded therein (Step S107; YES), the CPU 11 determines whether the CPU 11 has detected one light source 20 in the image 60 (Step S108). If the CPU 11 determines that the CPU 11 has detected one light source 20 in the image 60 (Step S108; YES), the CPU 11 determines and obtains, as candidates, target objects 30 photographable with the camera 14 on the basis of the previous positioning result and the current time being measured by the time measurer 15 (Step S109).

The CPU 11 attempts to detect, in the image 60, target objects 30 matching the candidates (obtain identification results of target objects 30), and determines whether the CPU 11 has detected one or more target objects 30 in the image 60 (Step S110). If the CPU 11 determines that the CPU 11 has detected no target object 30 in the image 60 (Step S110; NO), the CPU 11 moves the process to Step S105 to cause the moving object 10 to stop moving. If the CPU 11 determines that the CPU 11 has detected one or more target objects 30 in the image 60 (Step S110; YES), the CPU 11 performs positioning on the basis of the in-image positions and the in-space positions of the one light source 20 determined in Step S108 and the one or more target objects 30 determined in Step S110, and records the positioning result in the positioning history data 135 (Step S111).

In Step S108, if the CPU 11 determines that the CPU 11 has detected no light source 20 in the image 60 (Step S108; NO), the CPU 11 determines and obtains, as candidates, target objects 30 photographable with the camera 14 (Step S112) as in Step S109.

The CPU 11 attempts to detect, in the image 60, target objects 30 matching the candidates, and determines whether the CPU 11 has detected two or more target objects 30 in the image 60 (Step S113). If the CPU 11 determines that the CPU 11 has not detected two or more target objects 30 in the image 60 (Step S113; NO), the CPU 11 moves the process to Step S105 to cause the moving object 10 to stop moving. If the CPU 11 determines that the CPU 11 has detected two or more target objects 30 in the image 60 (Step S113; YES), the CPU 11 performs positioning on the basis of the in-image positions and the in-space positions of the two or more target objects 30 determined in Step S113, and records the positioning result in the positioning history data 135 (Step S114).

After Step S114, the CPU 11 reduces the moving speed of the moving object 10 to be lower than a predetermined reference value (Step S115). The positioning accuracy of positioning using only target objects 30 as position indicators is lower than the positioning accuracy of positioning using two light sources 20 as position indicators. If the moving object 10 moves on the basis of the positioning result of positioning using only target objects 30 as position indicators, the moving object 10 is likely to greatly deviate from a planned route. For this reason, in Step S115, the CPU 11 reduces the moving speed of the moving object 10, thereby suppressing increase in the deviation. If the moving speed is already lower than the reference value when the CPU 11 is about to start Step S115, the CPU 11 skips Step S115.

After Step S111 too, the CPU 11 May move the process to Step S115 to reduce the moving speed. That is, the CPU 11 may reduce the moving speed of the moving object 10 whenever the CPU 11 performs positioning using one or more target objects 30 as position indicators. If the CPU 11 performs positioning using not only one or more target objects 30 but also two or more light sources 20 as position indicators, the CPU 11 May not reduce the moving speed of the moving object 10.

After Step S104, Step S111 or Step S115, the CPU 11 determines a route to a destination on the basis of the positioning result, and causes the moving object 10 to move along the route (Step S116). The route to the destination is set such that a plurality of light sources 20 is observable from any point on the route. The CPU 11 determines whether the moving object 10 has arrived at the destination (Step S117). If the CPU 11 determines that the moving object 10 has not arrived at the destination (Step S117; NO), the CPU 11 returns the process to Step S101. If the CPU 11 determines that the moving object 10 has arrived at the destination (Step S117; YES), the CPU 11 ends the positioning-and-moving process.

Figure 9:
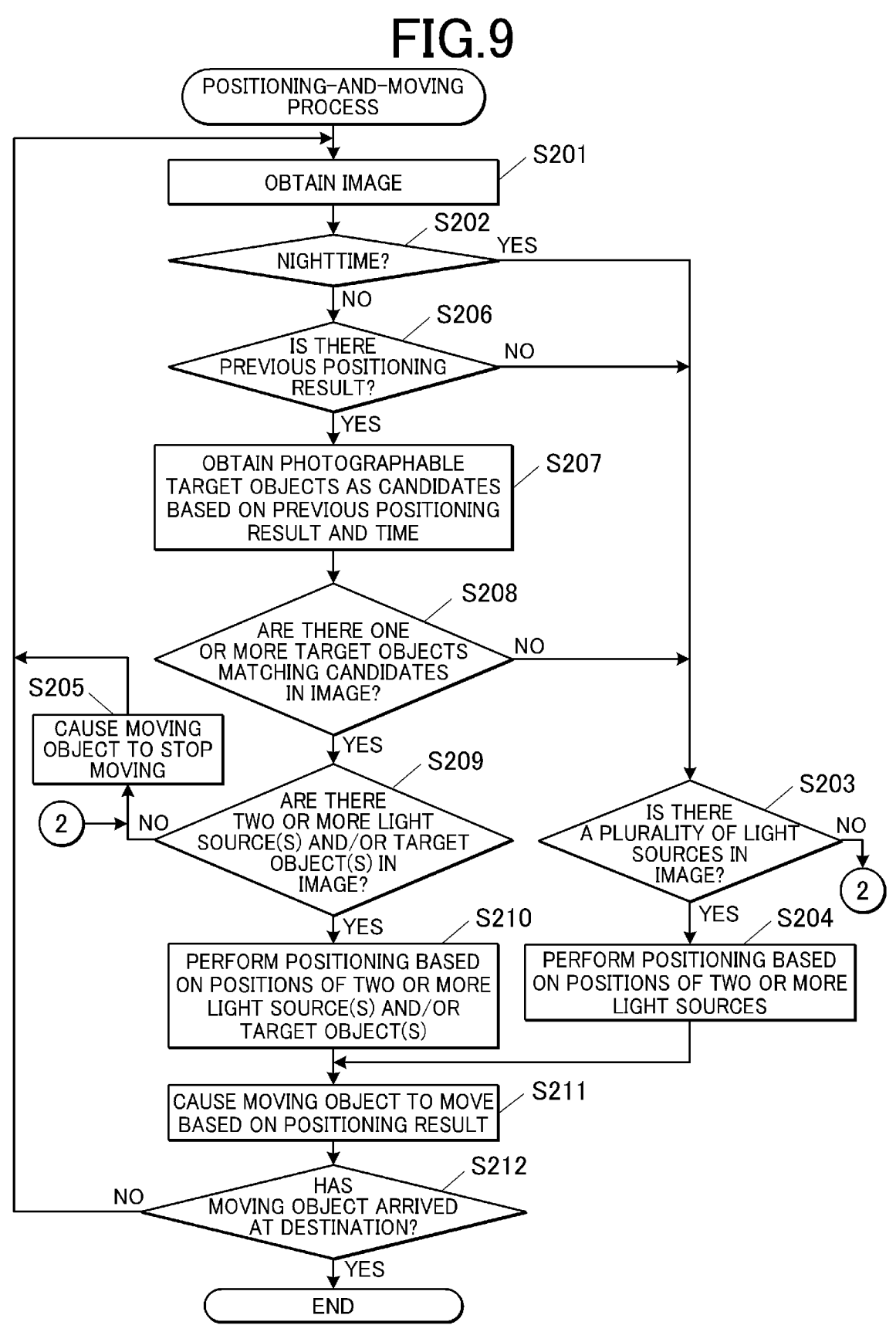
FIG. 9 is a flowchart showing another example of the control procedure of the positioning-and-moving process.

Instead of the flowchart shown in FIG. 8, the CPU 11 May follow the flowchart shown in FIG. 9. The flowchart shown in FIG. 9 is a flowchart with which the CPU 11 uses target objects 30 as position indicators if the CPU 11 detects these in the image 60 no matter whether the CPU 11 detects light sources 20 in the image 60. This enhances the positioning accuracy to the best possible positioning accuracy according to the detection state of light sources 20 and target objects 30 in the image 60.

Step S201 to Step S205 of the positioning-and-moving process in FIG. 9 are the same as Step S101 to Step S105 in FIG. 8, and hence their descriptions will be omitted.

In Step S202, if the CPU 11 determines that it is not nighttime (Step S202; NO), the CPU 11 determines whether a previous positioning result is recorded in the positioning history data 135 (Step S206). If the CPU 11 determines that no previous positioning result is recorded therein (Step S206; NO), the CPU 11 moves the process to Step S203. If the CPU 11 determines that a previous positioning result is recorded therein (Step S206; YES), the CPU 11 determines and obtains, as candidates, target objects 30 photographable with the camera 14 on the basis of the previous positioning result and the current time being measured by the time measurer 15 (Step S207).

The CPU 11 attempts to detect, in the image 60, target objects 30 matching the candidates, and determines whether the CPU 11 has detected one or more target objects 30 in the image 60 (Step S208). If the CPU 11 determines that the CPU 11 has detected no target object 30 in the image 60 (Step S208; NO), the CPU 11 moves the process to Step S203. If the CPU 11 determines that the CPU 11 has detected one or more target objects 30 in the image 60 (Step S208; YES), the CPU 11 further attempts to detect light sources 20 in the image 60, and determines whether the CPU 11 has detected two or more light source(s) 20 and/or target object (s) 30 (i.e., at least two position indicators) in the image 60 (Step S209). If the CPU 11 determines that the CPU 11 has not detected two or more light source(s) 20 and/or target object(s) 30 in the image 60 (Step S209; NO), the CPU 11 moves the process to Step S205 to cause the moving object 10 to stop moving because the CPU 11 cannot perform positioning. If the CPU 11 determines that the CPU 11 has detected two or more light source(s) 20 and/or target object (s) 30 in the image 60 (Step S209; YES), the CPU 11 performs positioning on the basis of the in-image positions and the in-space positions of the two or more light source(s) 20 and/or target object(s) 30 determined in Step S209, and records the positioning result in positioning history data 135 (Step S210). If the CPU 11 detects seven or more light source(s) 20 and/or target object(s) 30 in the image 60 in total as position indicators, the CPU 11 selects six position indicators, giving priority to light sources 20, before starting Step S210.

After Step S210 or Step S204, the CPU 11 moves the process to Step S211. Step S211 and Step S212 are the same as Step S116 and Step S117 in FIG. 8, and hence their descriptions will be omitted.

Advantageous Effects

As described above, the positioning device 100 of this embodiment includes the CPU 11, and the CPU 11 detects a light source(s) 20 and a target object(s) 30 (e.g., mountaintop 30$a$), which is/are different from the light source(s) 20, in the image 60 captured by the camera 14, wherein the moving object 10 has the camera 14 and moves in the space 500, and derives the position of the moving object 10 in the space 500 based on the positions of the light source(s) 20 and the target object(s) 30 in the image 60 and the known positions of the light source(s) 20 and the target object(s) 30 in the space 500. Positioning solely based on light of light sources has a risk of becoming unperformable depending on the environment. For example, positioning cannot be performed because light of light sources cannot be received well. In contrast, the positioning device 100 of the present disclosure can perform positioning using at least two position indicators even in the environment where light of light sources 20 is unobservable. For example, the positioning device 100 can perform positioning even in the situation where light sources 20 are unobservable due to strong sunlight in the daytime on the lunar surface. Thus, the positioning device 100 can perform more reliable positioning.

If the CPU 11 detects one light source 20 and a target object(s) 30 in the image 60, the CPU 11 derives the position of the moving object 10 in the space 500 based on the positions of the one light source 20 and the target object(s) 30 in the image 60 and the known positions of the one light source 20 and the target object(s) 30 in the space 500. If the CPU 11 detects a plurality of light sources 20, the CPU 11 derives the position of the moving object 10 in the space 500 based on the positions of at least two light sources 20 among the plurality of light sources 20 in the image 60 and the known positions of the at least two light sources 20 in the space 500. Thus, in the case where only one light source 20 is detectable in the image 60, positioning can be performed by further using a target object(s) 30 as a position indicator (s), whereas in the case where a plurality of light sources 20 is detectable in the image 60, positioning can be performed with high accuracy by using two or more light sources 20 as position indicators. Thus, the positioning device 100 can perform reliable positioning regardless of the environment, and also can perform highly accurate positioning in a suitable environment.

If the CPU 11 detects a plurality of light sources 20 and a target object(s) 30 in the image 60, the CPU 11 derives the position of the moving object 10 in the space 500 based on the positions of at least two light sources 20 among the plurality of light sources 20 and the target object(s) 30 in the image 60 and the known positions of the at least two light sources 20 and the target object(s) 30 in the space 500. Thus, in the case where a plurality of light sources 20 is detectable in the image 60, positioning can be performed with higher accuracy by further using a target object(s) 30 as a position indicator(s).

If the CPU 11 detects a light source(s) 20 and a plurality of target objects 30 in the image 60, the CPU 11 derives the position of the moving object 10 in the space 500 based on the positions of the light source(s) 20 and at least two target objects 30 among the plurality of target objects 30 in the image 60 and the known positions of the light source(s) 20 and the at least two target objects 30 in the space 500. Thus, in the case where one or more light sources 20 are detectable in the image 60, the positioning accuracy can be enhanced by further using two or more target objects 30 as position indicators.

The CPU 11 obtains, based on the position of the moving object 10 in the space 500 derived most recently, an identification result(s) of a target object(s) 30 that is/are in the image 60, and determines the known position(s) of the target object(s) 30 in the space 500 based on the obtained identification result(s) of the target object(s) 30. Thus, the positioning device 100 can detect (identify) target objects 30 on the basis of the current position (most recent position) of the moving object 10.

The CPU 11 obtains the identification results(s) of the target object(s) 30 that is/are in the image 60 further based on the current time. Thus, the positioning device 100 can exclude target objects 30 determined in advance to be unobservable in a time period that includes the current time from the detection target, and accordingly can detect target objects 30 in the image 60 more appropriately/efficiently.

Each light source 20 emits light with a unique emission pattern, and the CPU 11 identifies a light source 20 based on an emission pattern determined from the image 60, and determines the known position of the light source 20 in the space 500 based on an identification result of the light source 20. Thus, the positioning device 100 can determine the positions of light sources 20 without transmission/reception of radio waves. Further, the positioning device 100 can determine the positions of light sources 20 with high accuracy in resolution of pixels of the image 60 captured by the camera 14, which can enhance the positioning accuracy.

The moving object 10 of this embodiment includes the positioning device 100 and the camera(s) 14, and can perform more reliable positioning.

The moving object 10 includes the CPU 11, and if the CPU 11 derives the position of the moving object 10 in the space 500 based on the positions of at least two target objects 30 in the space 500, the CPU 11 reduces the moving speed of the moving object 10 to be lower than a reference value. Use of a target object(s) 30 as a position indicator(s) tends to reduce the positioning accuracy. The moving object 10, however, reduces its moving speed, thereby being able to suppress increase in deviation from a planned route.

The positioning method of this embodiment includes detecting a light source(s) 20 and a target object(s) 30, which is/are different from the light source(s) 20, in the image(s) 60, and deriving the position of the moving object 10 in the space 500 based on the positions of the light source(s) 20 and the target object(s) 30 in the image 60 and the known positions of the light source(s) 20 and the target object(s) 30 in the space 500. Thus, the positioning method enables more reliable positioning.

The storage 13 of this embodiment is a non-transitory computer-readable storage medium storing the programs 131. The program(s) 131 causes the CPU 11 to detect a light source(s) 20 and a target object(s) 30, which is/are different from the light source(s) 20, in the image(s) 60, and derive the position of the moving object 10 in the space 500 based on the positions of the light source(s) 20 and the target object(s) 30 in the image 60 and the known positions of the light source(s) 20 and the target object(s) 30 in the space 500. Thus, the program(s) 131 enables more reliable positioning.

Others

The present disclosure is not limited to the above embodiment, and various modifications can be made.

For example, the moving object 10 is not limited to the lunar rover that autonomously moves. The moving object 10 May be a rover that is operated by a person (including an automatic operation mode), a robot, or the like.

Further, the positioning system 1 May be used on the earth. For example, the present disclosure may be applied to positioning of a vehicle (e.g., forklift) as a moving object that moves in a space in a warehouse.

Further, in the above embodiment, the in-space position of each light source 20 is obtained from its light source ID which is determined by decoding the emission pattern of the light source 20. However, if the emission pattern of each light source 20 contains a sufficient amount of information, the in-space position of each light source 20 May be obtained directly from the emission pattern of the light source 20 decoded.

Further, in positioning, the positioning device 100 may derive only the position of the moving object 10 on the basis of the image 60, and derive the orientation of the moving object 10 with another method (e.g., on the basis of the detection result by the attitude angle detector 17).

Further, in the above embodiment, as light of each light source 20, which is light for visible light communication, three colors of light, namely, red light, green light and blue light, are used in combination, but light of each light source 20 is not limited thereto. For example, colors of light to be used may be different from these, or the number of colors of light to be used may be two or less or four or more. Further, light fidelity (Li-Fi), which transmits information by light modulated at high speed, may be used. Further, visible light communication may be replaced by optical communication using infrared rays or ultraviolet rays.

Further, the non-transitory computer-readable storage medium storing the program(s) of the present disclosure is not limited to the HDD, the SSD or the like of the storage 13. The non-transitory computer-readable storage medium may be an information storage medium, such as a flash memory or a CD-ROM. Further, as a medium to provide data of the program(s) of the present disclosure via a communication line, a carrier wave may be used.

It is a matter of course that the detailed configuration and operation of each component of the positioning device 100 and the moving object 10 in the above embodiment can be changed appropriately without departing from the scope of the present disclosure.

Although one or more embodiments of the present disclosure have been described above, the scope of the present disclosure is not limited to the embodiments above but includes the scope of claims below and the scope of their equivalents.

The invention claimed is:

1. A positioning device comprising:
   at least one processor configured to:
      determine whether a condition that reduces a likelihood of detecting light of a light source is satisfied;

in response to determining that the condition is satisfied, determine a number of one or more light sources detected in an image captured by an imager, wherein a moving object has the imager and moves in a space;

determine a number of one or more target objects different from the one or more light sources detected in the image;

select, based on the number of one or more light sources detected in the image, a set of position indicators from among the one or more light sources and the one or more target objects detected in the image to be used in deriving a position of the moving object in the space;

derive the position of the moving object in the space based on in-image positions of the selected set of position indicators and known positions of the selected set of position indicators in the space; and control movement of the moving object based on the position derived.

2. The positioning device according to claim 1, wherein the at least one processor is configured to:

in a case where the number of the one or more light sources detected in the image is one light source and the number of the one or more target objects detected in the image is at least one target object, derive the position of the moving object in the space based on positions of the detected one light source and the at least one target object in the image and known positions of the detected one light source and the at least one target object in the space, and in a case where the number of the one or more light sources detected in the image is a plurality of light sources, derive the position of the moving object in the space based on positions of at least two light sources among the plurality of light sources detected in the image and known positions of the at least two light sources in the space.

3. The positioning device according to claim 1, wherein in a case where the number of the one or more light sources detected in the image is a plurality of light sources and the number of the one or more target objects detected in the image is at least one target object, the at least one processor is configured to derive the position of the moving object in the space based on positions of at least two light sources among the plurality of light sources and the at least one target object detected in the image and known positions of the at least two light sources and the at least one target object in the space.

4. The positioning device according to claim 1, wherein in a case where the number of the one or more light sources detected in the image is at least one light source and the number of the one or more target objects detected in the image is a plurality of target objects, the at least one processor is configured to derive the position of the moving object in the space based on positions of the at least one light source and at least two target objects among the plurality of target objects detected in the image and known positions of the at least one light source and the at least two target objects in the space.

5. The positioning device according to claim 1, wherein the at least one processor is configured to:

obtain, based on the position of the moving object in the space derived most recently, an identification result of the one or more target objects detected in the image, and determine a known position of the one or more target objects in the space based on the obtained identification result of the one or more target objects.

6. The positioning device according to claim 5, wherein the at least one processor is configured to obtain the identification result of the one or more target objects detected in the image further based on a current time.

7. The positioning device according to claim 1, wherein each of the one or more light sources emit light with a unique emission pattern, and wherein the at least one processor is configured to detect the each of the one or more light sources based on the unique emission pattern determined from the image.

8. A moving object comprising:

the positioning device according to claim 1; and the imager.

9. The positioning device according to claim 8, wherein the at least one processor is configured to:

in response to deriving the position of the moving object in the space based on in-image positions of the selected set of position indicators and known positions of the selected set of position indicators in the space, control the movement of the moving object based on the position derived at a moving speed lower than a reference value.

10. A positioning method that is performed by a computer, comprising:

determining whether a condition that reduces a likelihood of detecting light of a light source is satisfied;

in response to determining that the condition is satisfied, determining a number of one or more light sources detected in an image captured by an imager, wherein a moving object has the imager and moves in a space;

determining a number of one or more target objects different from the one or more light sources detected in the image;

selecting, based on the number of one or more light sources detected in the image, a set of position indicators from among the one or more light sources and the one or more target objects detected in the image to be used in deriving a position of the moving object in the space;

deriving the position of the moving object in the space based on in-image positions of the selected set of position indicators and known positions of the selected set of position indicators in the space; and controlling movement of the moving object based on the position derived.

11. A non-transitory computer-readable storage medium storing a program that causes a computer to:

determine whether a condition that reduces a likelihood of detecting light of a light source is satisfied;

in response to determining that the condition is satisfied, determine a number of one or more light sources detected in an image captured by an imager, wherein a moving object has the imager and moves in a space;

determine a number of one or more target objects different from the one or more light sources detected in the image;

select, based on the number of one or more light sources detected in the image, a set of position indicators from among the one or more light sources and the one or more target objects detected in the image to be used in deriving a position of the moving object in the space;

derive the position of the moving object in the space based on in-image positions of the selected set of position indicators and known positions of the selected set of position indicators in the space; and control movement of the moving object based on the position derived.

12. The positioning device according to claim 1, wherein the at least one processor is configured to:

in response to determining that a first number of the one or more light sources is detected in the image, derive a position of the moving object in the space based on positions of at least a first minimum number of the one or more target objects in the image; and in response to determining that a second number of the one or more light sources is detected in the image, where the second number is larger than the first number, derive the position of the moving object in the space based on positions of the second number of the one or more light sources and at least a second minimum number of the one or more target objects in the image, where the second minimum number is less than the first minimum number.

* * * * *